United States Patent [19]

Sato et al.

[11] Patent Number: 5,416,183
[45] Date of Patent: May 16, 1995

[54] ROOM TEMPERATURE CURABLE COMPOSITION

[75] Inventors: Shinichi Sato; Hitoshi Kinami; Takashi Matsuda; Hirokazu Yamada, all of Annaka, Japan

[73] Assignee: Shin-Etsu Chemical Co., Ltd., Tokyo, Japan

[21] Appl. No.: 209,066

[22] Filed: Mar. 11, 1994

[30] Foreign Application Priority Data

Mar. 12, 1993 [JP] Japan .................. 5-078866

[51] Int. Cl.⁶ .................. C08G 69/48; C08G 77/62; C08L 83/16
[52] U.S. Cl. .................. 528/15; 525/478; 528/31; 528/32; 528/42
[58] Field of Search .................. 528/15, 31, 32, 42; 556/419; 525/478

[56] References Cited

U.S. PATENT DOCUMENTS

| | | | |
|---|---|---|---|
| 4,094,911 | 6/1978 | Mitsch et al. | 556/419 |
| 4,100,136 | 7/1978 | Carter et al. | 528/42 |
| 4,968,766 | 11/1990 | Kendziorski | 528/42 |
| 5,300,613 | 5/1994 | Kishita et al. | 528/42 |
| 5,312,885 | 5/1994 | Takago et al. | 528/42 |

*Primary Examiner*—Robert E. Sellers
*Attorney, Agent, or Firm*—Oblon, Spivak, McClelland, Maier & Neustadt

[57] ABSTRACT

A room temperature curable composition comprising:
(A) a fluorine-containing organosilicon compound having the formula (1):

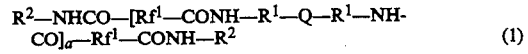

$$R^2-NHCO-[Rf^1-CONH-R^1-Q-R^1-NHCO]_a-Rf^1-CONH-R^2 \quad (1)$$

wherein $a$ is an integer of 0 or more, $Rf^1$ is a perfluoroalkylene group or perfluoropolyether group, $R^1$ is a divalent hydrocarbon group, $R^2$ is a monovalent aliphatic unsaturated hydrocarbon group, and Q is a particular organosilicon group,
(B) an organohydrogenpolysiloxane containing at least two Si—H groups in its molecule, and
(C) a platinum family metal compound, the component (B) being contained such that the Si—H groups are contained in an amount of 0.5 to 5.0 moles per mole of the aliphatic unsaturated hydrocarbon group contained in the composition. The composition produces a cured product having good solvent resistance, chemical resistance, heat resistance and cold resistance.

12 Claims, No Drawings

ROOM TEMPERATURE CURABLE COMPOSITION

BACKGROUND OF THE INVENTION

1. Field of the Invention

The present invention relates to a room temperature curable composition that can be readily cured by allowing it to stand at room temperature or heating, and particularly to a composition capable of producing a cured product with good solvent resistance, chemical resistance and heat resistance.

2. Description of the Prior Art

Heretofore, so-called room temperature curable compositions that can be stably stored with flowability being maintained under closed conditions but can be cured by the action of moisture in the atmosphere at room temperature to produce a rubberlike elastomeric product, are known. The curable compositions are extensively used as sealing materials, coating materials or adhesives in the fields of the construction industry, machine industry or electrical industry.

However, the known room temperature curable compositions can not produce cured products excellent in all of the properties of solvent resistance, chemical resistance, heat resistance and cold resistance. For example, the room temperature curable organopolysiloxane compositions can form cured products having good heat resistance and cold resistance, but they are not satisfactory in solvent resistance and chemical resistance. The other room temperature curable compositions form cured products having poor heat resistance.

SUMMARY OF THE INVENTION

Accordingly, an object of the present invention is to provide a room temperature curable composition capable of forming cured products excellent in all of the solvent resistance, chemical resistance, heat resistance and cold resistance.

According to the present invention, there is provided a room temperature curable composition comprising:

(A) a fluorine-containing organosilicon compound having the general formula (1):

$$R^2-NHCO-[Rf^1-CONH-R^1-Q-R^1-NH-CO]_a-Rf^1-CONH-R^2 \quad (2)$$

wherein a is an integer of 0 or more, $Rf^2$ is a divalent perfluoroalkylene group or divalent perfluoropolyether group, $R^2$ is a divalent hydrocarbon group, $R^2$ is a monovalent aliphatic unsaturated hydrocarbon group, and Q is an organosilicon group having the general formula (2):

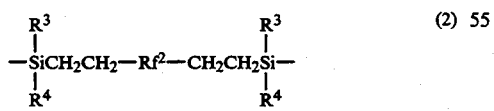

where $R^3$ and $R^4$ may be the same or different and are each an unsubstituted or substituted monovalent hydrocarbon group, $Rf^2$ is a divalent perfluoroalkylene group or divalent perfluoropolyether group, (B) an organohydrogenpolysiloxane containing at least two Si—H groups in its molecule, and (C) a catalytic amount of a platinum family metal compound, said component (B) being present such that the Si—H groups are present in an amount of 0.5 to 5.0 moles per mole of the aliphatic unsaturated hydrocarbon group contained in the composition.

According to the present invention, there is also provided a cured product obtained by curing said room temperature curable composition.

According to the room temperature curable composition of the present invention, it is possible to form cured products excellent in all of the solvent resistance, chemical resistance, heat resistance and cold resistance.

DETAILED DESCRIPTION OF PREFERRED EMBODIMENTS (A) Fluorine-containing organosilicon compound In the general formula (1), the divalent hydrocarbon group $R^1$ includes, for example, $C_1$ to $C_8$ alkylene groups such as $-CH_2-CH_2-$, $-CH_2-CH_2-CH_2-$, or $-(CH_2)_6-$, and preferably includes, for example, $-CH_2-CH_2-$ and $-CH_2-CH_2-CH_2-$ or the like, and

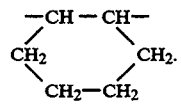

The monovalent aliphatic unsaturated hydrocarbon group $R^2$ includes, for example, alkenyl groups such as e.g. a vinyl group, allyl group or the like; cycloalkenyl groups such as e.g. a cyclohexenyl group; arylalkenyl groups such as e.g. a styryl group; alkynyl groups such as e.g. ethynyl group.

Typical examples of the divalent perfluoroalkylene group or divalent perfluoropolyether group, $Rf^1$ and $Rf^2$, includes:

$$-C_pF_{2p}-$$

wherein p is an integer of 2 to 12,

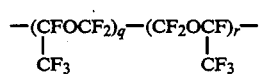

wherein q is an integer of 1 to 50, and r is an integer of 1 to 50,

wherein s is an in integer of 1 to 30,

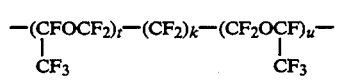

wherein t is an integer of 1 to 50, u is an integer of 1 to 50, k is an integer of 1 to 10,

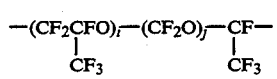

wherein i is an integer of 0 to 50, and j is an integer of 0 to 25,

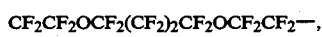

Typical examples of the organosilicon group represented by Q includes those represented by:

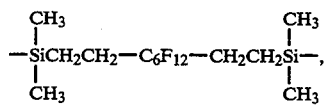

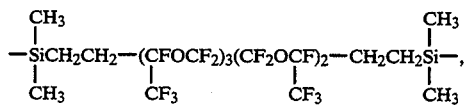

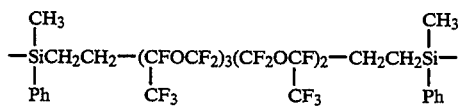

where Ph stands for a phenyl group,

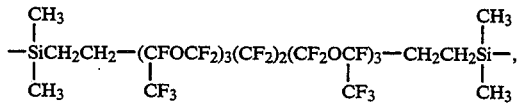

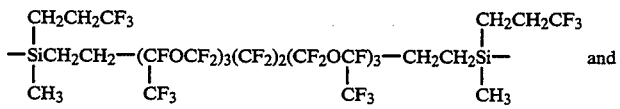  and

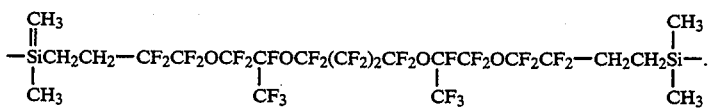

Preferred are:

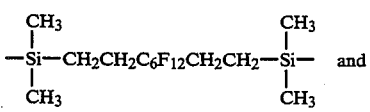  and

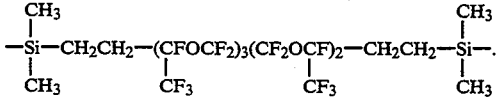

The fluorine-containing organosilicon compound (A) can be synthesized, for example, by reacting a compound having the allyl group at both of the terminal ends, represented by the formula (3):

$$CH_2=CHCH_2NHCO-Rf^1-CONHCH_2CH=CH_2 \quad (3)$$

wherein $Rf^1$ is as defined above, with a compound represented by the formula (4):

$$H-Q-H \quad (4)$$

wherein Q is as defined above, in the presence of an addition reaction catalyst. It is required that the amount of the compound of the formula (3) is more than that of the compound of the formula (4) in molar basis. In this synthesis, as the ratio of the amount (a) of the compound of the formula (3) to that (b) of the compound of the formula (4), (a)/(b), is increased, a polymer with a relatively small molecular weight may be synthesized; on the other hand, the ratio (a)/(b) is closer to 1, a polymer with a larger molecular weight may be synthesized. The reaction may be carried out normally at 50° to 150° C., and preferably 80° to 120° C. The catalyst

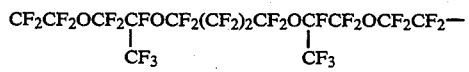

and the like. Among them, preferred are

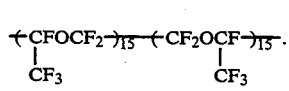

and

The a is an integer of 0 or more, and normally ranges from 3 to 50 on average, and preferably ranges from 5 to 20 on average.

In the general formula (2), the unsubstituted or substituted monovalent hydrocarbon groups, $R^3$ and $R^4$, include, for example, alkyl groups such as a methyl group, ethyl group, propyl group and the like; cycloalkyl groups such as e.g. a cyclohexyl group; aryl groups such as e.g. a cyclohexyl group; aryl groups such as e.g. phenyl group, tolyl group and the like; and corresponding substituent groups in which a part or the whole of the hydrogen atoms of the groups mentioned above have been substituted by a halogen atom, the cyano group or the like, e.g., 3,3,3-trifluoropropyl group, 6,6,6,5,5,4,4,3,3-nonafluorohexyl group, chloromethyl group, 3-chloropropyl group, 2-cyanoethyl group, 3-cyanopropyl group, etc. The groups $R^3$ and $R^4$ may be the same or different. Preferred examples of $R^3$ and $R^4$ include the methyl group, phenyl group and 3,3,3-trifluoropropyl group.

includes, for example, the group VIII elements in the Periodic Table or compounds thereof, for example, chloroplatinic acid, alcohol-modified chloroplatinic acid (see U.S. Pat. No. 3,220,972), complexes of the chloroplatinic acid and an olefin (U.S. Pat. Nos. 3,159,601, 3,159,662, 3,775,452), platinum black or palladium or the like supported on a career such as alumina, silica, carbon, etc., rhodiumolefin complexes, and chlorotris(triphenylphosphine)rhodium (Wilkinson catalyst). These complexes are preferably dissolved in an alcohol, ketone, ether, or hydrocarbon solvent.

As the fluorine-containing organosilicon compound (A) used for the present invention, may be used liquid polymers having a low viscosity like several cSt at 25° C. to solid polymers in the form of a gum. From viewpoint of easiness of handling, for example, gum-like polymers are suitable for heat vulcanizable rubbers, and polymers with a viscosity of about 100 to 100,000 cSt (25° C.) are suitable for rubbers which is in the form of liquid before curing. If the viscosity is too low, the resulting cured products may have a small elongation, so that it is difficult to achieve well-balanced physical properties thereof.

(B) Organohydrogenpolysiloxane

The organohydrogenpolysiloxane having at least two Si—H groups in its molecule, the component (B) of the present composition, acts as a crosslinking agent, and includes, for example:

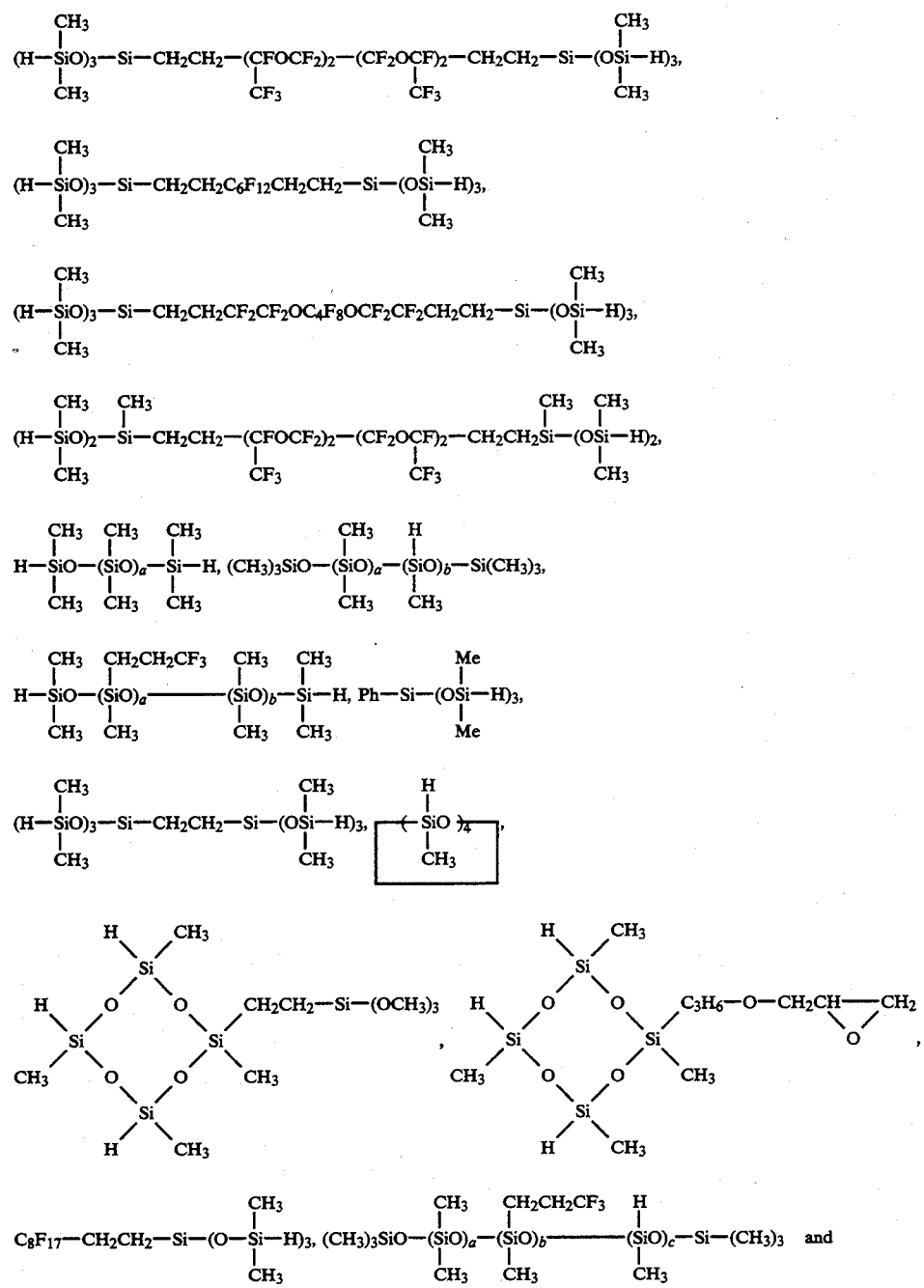

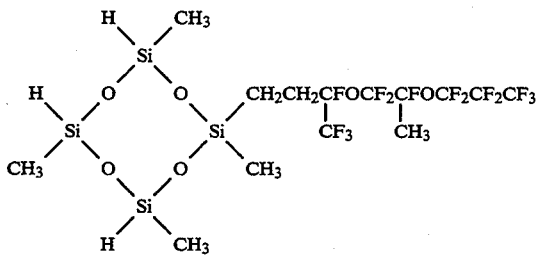

wherein m is an integer of 0 to 100, n is an integer of 1 to 50, Me is a methyl group, and Ph is a phenyl group.

The component (B) is desirably compatible with the component (A) to obtain a uniform cured product. For this reason, preferred are fluorine group-containing organohydrogenpolysiloxane, including, for example,

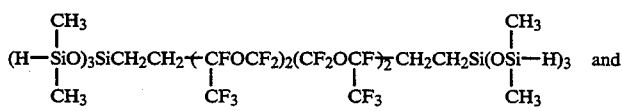

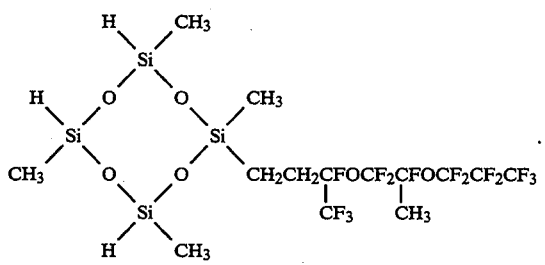

The organohydrogenpolysiloxane (B) can be produced by, for example, equilibrating

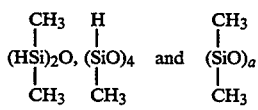

wherein e is an integer of 3 to 8, with an acid catalyst such as sulfuric acid. Alternatively, it can be prepared by co-hydrolysis of silanes or siloxanes corresponding to a desired structure. An organohydrogenpolysiloxane (B) having a special functional group can be prepared by, for example, partial addition reaction as described in Japanese Patent Publication (kokoku) No. 51-33540(1976).

The component (B), the organohydrogenpolysiloxane, may be linear or cyclic. Although the molecular weight may be small or large, polymers with a relatively small molecular weight of 30,000 or less are used, because of easy production.

The component (B) is contained in the composition in such an amount that the Si—H groups contained in the component (B) in an amount of normally 0.5 to 5.0 moles, preferably 1.2 to 3.0 moles, per mole of the aliphatic unsaturated hydrocarbon groups such as vinyl, allyl and, cycloalkenyl. If the amount of the component (B) is too small, the degree of crosslinking obtained by curing is sufficient; if too large, foaming may takes place when curing is carried out or a cured product with poor physical properties such as heat resistance, compression set, etc. is produced. Normally, the component (B) may be formulated in an amount of 0.1 to 50 parts by weight per 100 parts by weight of the component (A).

(C) Platinum family metal compound

The component (C), platinum family metal compound, serves as a catalyst for proceeding the addition reaction (hydrosilylation) of the components (A) and (B).

The platinum family metal compound includes, for example, compounds of platinum, rhodium, ruthenium, iridium and palladium. Since these are compounds of noble metals and expensive, platinum compounds which are relatively readily available are normally used.

The platinum compounds which may be used include, for example, chloroplatinic acid, complexes of the chloroplatinic acid and an olefin such as ethylene or the like, complexes of the chloroplatinic acid with an alcohol or a vinylsiloxane, solid catalysts comprising platinum supported on a silica, alumina carbon or the like. It is preferred to dissolve chloroplatinic acid or a complex in a suitable solvent and mix it uniformly with the component (A) for use.

Examples of rhodium, ruthenium, iridium and palladium compounds include $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$, wherein Ph stands for the phenyl group.

The component (C) may used in a catalytic amount. Specifically, it may be formulated in an amount of normally about 1 to about 1000 ppm, preferably 10 to 500 ppm.

The composition of the present invention can be made room temperature curable by selecting the monovalent aliphatic unsaturated hydrocarbon group contained in the component (A) and the catalyst, the component (C). The composition can be also made low temperature curable depending on the kind of the catalyst of the component (C) such that it can be cured at 100° to 150° C. within a short time of several minutes to several hours.

To the composition of the present invention, may be optionally added a variety of additives when the composition is put into practice. Specifically, the additives include, for example, organopolysiloxanes having a resinous structure composed of $SiO_2$ unit, $CH_2=CH(R')_2SiO_{0.5}$ unit, and $R'_3SiO_{0.5}$ unit where R' stands for an aliphatic unsaturation-free monovalent hydrocarbon group, for reinforcing the strength of the elastomeric cured products (See Japanese Patent Publication (kokoku) Nos. 38-26771(1963) and 45-9476(1970)); polysiloxanes containing a $CH_2=CH(R)SiO$ unit wherein R has the same meaning as $R^3$ and $R^4$ in the formula (2), for controlling cure rate of the composition (See Japanese Patent Publication (kokoku) No. 48-10947), acetylene compounds (See U.S. Pat. No. 3,445,420 and Japanese Patent Publication (kokoku) No. 54-3774), ionic compounds of heavy metals (see U.S. Pat. No. 3,532,649), etc.; and nonfunctional organopolysiloxanes for improving heat shock resistance, flexibility etc. of cured products. The additives may be added to the composition of the present invention as necessary within the level not impairing the properties of the composition.

Also, when such additives are added to the composition, 0.5 to 5 silicon-bonded hydrogen atoms should be contained per one unsaturated bond such as alkenyl groups, ethynyl group and the like in the whole composition.

Other components which may be optionally added to the composition of the present invention include, for example, fillers which may be added to reduce thermal shrinkage on curing, to preventing lowering of thermal expansion coefficient of elastomeric products obtained by curing, or to improve thermal stability, weatherability, chemical resistance, fire retardance, mechanical strength, etc. or to decrease gas permeation coefficients, including, for example, fumed silica, Quartz powder, glass fiber, carbon, metal oxides such as iron oxides, titanium oxide, cerium oxide, etc., metal carbonates such as calcium carbonate, magnesium carbonate, etc., pigments, dyestuff, and antioxidants. Furthermore, to the composition, may be added a suitable fluorine-containing solvent, for example, m-xylene, hexafluoride, FLUORINATE or the like, to adjust the concentration of the composition as desired.

Uses

The room temperature curable composition of the present invention can be used for a variety of purposes. Since it has a high fluorine content, the cured products thereof have good solvent resistance and chemical resistance. Since the cured products have a low a surface energy, it has good mold release properties and water repellency, and therefore is useful as oil seals, O-rings, sealants, molded parts, extruded parts, coatings, mold release agents, etc.

The working examples of the present invention will now be described below.

EXAMPLES

Example 1

To 100 parts by weight of a polymer having the formula (5):

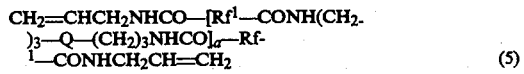

(5)

wherein a is 3 on average, and $Rf^1$ and Q are represented by the formulas:

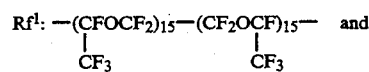

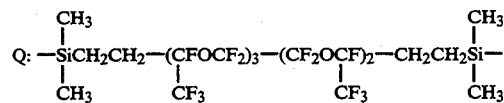

(viscosity: 11,200 cSt (25° C.); the amount of vinyl group: 0.011 mole/100 g), 15 parts by weight of a fumed silica reacted with trimethylsiloxy group and having a specific surface area of 200 m$^2$/g was added. The resultant mixture was mixed and heat-treated, and then kneaded with a three-roll mill. Subsequently, to the resulting mixture, 6.0 parts by weight of a methylhydrogensiloxane having the formula (6):

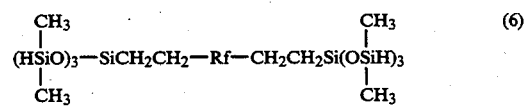

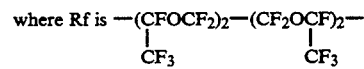

(the amount of Si—H group: 0.489 mole/100 g), 0.5 part by weight of carbon black, 0.2 part by weight of toluene solution of a catalyst prepared by modifying chloroplatinic acid with $CH_2=CHSi(CH_3)_2Si(CH_3)_2CH=CH_2$ (platinum concentration: 1.0% by weight), and 0.3 part by weight of 2-ethynylisopropanol were added, and these were mixed. Subsequently, the mixture was degassed under a reduced pressure, placed in a rectangular frame with a thickness of 2 mm, and then degassed again. After that, the mixture was cured under a pressure of 120 kg/cm$^2$ at 150° C. for 20 minutes to form a cured product in the form of sheet. A piece of test specimen was cut out and measured for physical properties according to JIS K 6301. The results obtained are given below.

Hardness (JIS-A*) 48
Elongation (%) 200
Tensile strength (kgf/cm$^2$) 42
(* Note: Measured using Type A spring hardness tester according to JIS K6301)

Example 2

The procedure of Example 1 was repeated, except that 6.7 parts by weigh of a methylhydrogenpolysiloxane having the formula (7):

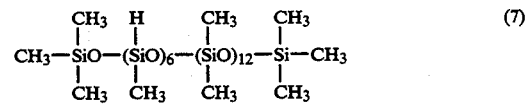

(Si—H group amount: 0.426 mole/100 g) was used in place of the methyhydrogenpolysiloxane of the formula (6), to produce a cured sheet. A piece of test specimen was cut out from the sheet and measured for physical properties according to JIS K 6301. The results obtained are given below.

Hardness (JIS-A *) 44
Elongation (%) 230
Tensile strength (kgf/cm²) 34

Example 3

The procedure of Example 1 was repeated, except that 100 parts by weight of a polymer having the formula (8):

$$CH_2=CHCH_2NHCO—[Rf^1—CONH(CH_2)_3—Q—(CH_2)_3NHCO]_a—Rf^1—CONHCH_2CH=CH_2 \quad (8)$$

wherein a is 5 on average, and Rf¹ and Q are represented by the formulas:

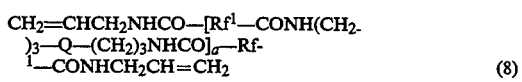

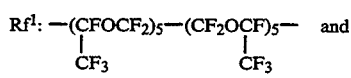

respectively (viscosity: 7400 cSt at 25° C.; vinyl group amount: 0.013 mole/100 g), was used in place of the polymer of the formula (5) and 6.5 parts by weight of methylhydrogenpolysiloxane of the formula (6) was used. A piece of test specimen was cut out from the cured sheet obtained, and measured for physical properties according to JIS K 6301. The results are given below.

Hardness (JIS-A) 52
Elongation (%) 170
Tensile strength (kgf/cm²) 33

Example 4

The procedure of Example 1 was repeated, except that a polymer of the formula (9):

$$CH_2=CHCH_2NHCO—[—Rf^1-CONH(CH_2)_3—Q—(CH_2)_3NHCO—]_a—Rf^1—CONHCH_2CH=CH_2 \quad (9)$$

wherein a is 10 on average, and Rf¹ and Q are represented by the formulas:

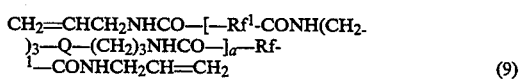

and

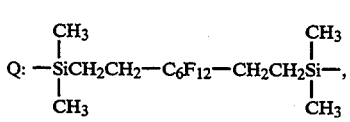

respectively (viscosity 6200 cSt at 25° C., vinyl group amount: 0.013 mole/100 g) was used in place of the polymer of the formula (5), and 6.5 parts by weight of the methylhydrogenpolysiloxane of the formula (6), to produce a cured sheet. A piece of test specimen was cut out from the sheet and measured for physical properties according to JIS K 6301. The results are given below.

Hardness (JIS-A) 58
Elongation (%) 150
Tensile strength (kgf/cm²) 38

Test on chemical resistance, solvent resistance, and heat resistance

The cured sheets obtained in Examples 1 to 4 were tested for chemical resistance and solvent resistance under the conditions below. For comparison, a cured silicone rubber sheet (tradename: KE 951, product by Shin-Etsu Chemical Co., Ltd.) was also tested for chemical resistance in the same manner, and a cured fluorine rubber sheet (tradename: Viton E-60C., product by Du Pont) was tested for solvent resistance in the same manner. The results are given in Tables 1 and 2.

Chemical resistance test:

A piece of test specimen was immersed in an aqueous solution of an alkali or acid as shown in Table 1 for 7 days. After that, a volume change (%) relative to the initial volume was measured.

Solvent resistance test:

A piece of test specimen was immersed in an organic solvent as shown in Table 2 for 7 days. After that, a volume change (%) relative to the initial volume was measured.

TABLE 1

| 10% Aqueous solution of: | Volume change Δ V (%) | | | | |
|---|---|---|---|---|---|
| | Example 1 | Example 2 | Example 3 | Example 4 | Silicone rubber (control) |
| NaOH | 0 | 0 | 0 | 0 | 0 |
| HCl | 0 | 0 | 0 | 0 | 2 |
| HNO₃ | 0 | 0 | 0 | 0 | 8 |
| H₂SO₄ | 0 | 1 | 0 | 1 | 5 |

Test conditions: 25° C. for 7 days
Silicone rubber used in control: tradename KE-951, product of Shin-Etsu Chemical Co., Ltd.

TABLE 2

| | Volume change Δ V (%) | | | | |
|---|---|---|---|---|---|
| | Example 1 | Example 2 | Example 3 | Example 4 | Fluoro rubber (control) |
| Toluene | 3 | 5 | 3 | 2 | 8 |
| n-Hexane | 6 | 10 | 6 | 5 | 1 |
| Methanol | 2 | 4 | 3 | 3 | 92 |
| Methyl ethyl Ketone | 9 | 11 | 8 | 8 | 240 |

Test conditions: 25° C. for 7 days
Fluoro rubber used in control: tradename Viton E-60C, product of du Pont Heat resistance test The cured sheet obtained in Example 1 was aged at 200° C. for 120 hours, and then it was measured for mechanical properties in the same manner as described above. The weigh loss of the aged cured sheet relative to the initial cured sheet before aging, was measured. The results are given in Table 3.

TABLE 3

| | Initial value | After aging 200° C. × 120 hrs |
|---|---|---|
| Hardness (JIS-A) | 48 | 49 |
| Elongation (%) | 200 | 190 |
| Tensile strength (kg/cm²) | 42 | 43 |
| Weight loss on heating (%) | — | 0.6 |

We claim:

1. A room temperature curable composition comprising:
   (A) a fluorine-containing organosilicon compound having the general formula (1):

$$R^2\text{---NHCO---}[Rf^1\text{---CONH---}R^1\text{---}Q\text{---}R^1\text{---NH-CO}]_a\text{---}Rf^1\text{---CONH---}R^2 \quad (1)$$

wherein a is an integer of more than 0 up to 50, $Rf^1$ is a divalent perfluoroalkylene group or divalent perfluoropolyether group, $R^1$ is a divalent hydrocarbon group, $R^2$ is a monovalent aliphatic unsaturated hydrocarbon group, and Q is an organosilicon group having the general formula (2):

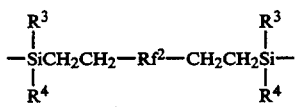

where $R^3$ and $R^4$ may be the same or different and are each an unsubstituted or substituted monovalent hydrocarbon group, $Rf^2$ is a divalent perfluoroalkylene group or divalent perfluoropolyether group, (B) an organohydrogenpolysiloxane containing at least two Si—H groups in its molecule, and (C) a catalytic amount of a platinum family metal compound, said component (B) being contained such that the Si—H groups are contained in an amount of 0.5 to 5.0 moles per mole of the aliphatic unsaturated hydrocarbon group contained in the composition.

2. The composition of claim 1, wherein the $R^1$ in the general formula (1) is at least one member selected from the group consisting of —CH$_2$—CH$_2$— and —CH$_2$—CH$_2$—CH$_2$—.

3. The composition of claim 1, wherein $Rf^1$ in the general formula (1) is at least one member selected from the group consisting of:

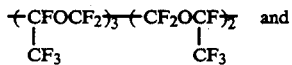 and

-continued

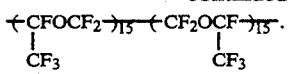

4. The composition of claim 1, wherein $R^3$ in the general formula (2) is at least one member selected from the group consisting of a methyl group, phenyl group and 3,3,3-trifluoropropyl group.

5. The composition of claim 1, wherein $R^4$ in the general formula (2) is at least one member selected from the group consisting of the methyl group, phenyl group and 3,3,3-trifluoropropyl group.

6. The composition of claim 1, wherein Q in the general formula (1) is represented by the formula:

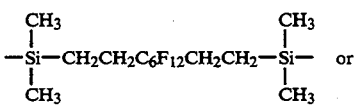

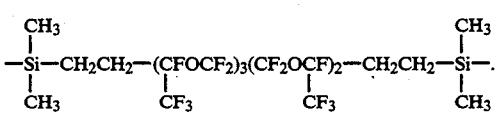

7. The composition of claim 1, wherein a in the general formula (1) ranges from 3 to 50 on average.

8. The composition of claim 1, wherein the component (B) contains a fluorine-containing group.

9. The composition of claim 1, wherein the component (B) is contained in such an amount that the Si—H groups is present in an amount of 1.2 to 3.0 mole per mole of the aliphatic unsaturated groups contained in the composition.

10. The composition of claim 1, wherein the component (C) is a platinum compound.

11. The composition of claim 1, wherein the component (C) is present in an amount of 1 to 1,000 ppm in the composition.

12. The cured product obtained by curing the composition as claimed in claim 1.

* * * * *